(12) United States Patent
Nawa et al.

(10) Patent No.: US 9,667,169 B2
(45) Date of Patent: May 30, 2017

(54) POWER CONVERSION APPARATUS

(71) Applicant: Hitachi Automotive Systems, Ltd., Hitachinaka-shi, Ibaraki (JP)

(72) Inventors: Masamichi Nawa, Hitachinaka (JP); Takayuki Itsuji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 31 days.

(21) Appl. No.: 14/352,187

(22) PCT Filed: Nov. 15, 2012

(86) PCT No.: PCT/JP2012/079649
§ 371 (c)(1),
(2) Date: Apr. 16, 2014

(87) PCT Pub. No.: WO2013/073612
PCT Pub. Date: May 23, 2013

(65) Prior Publication Data
US 2014/0239870 A1  Aug. 28, 2014

(30) Foreign Application Priority Data

Nov. 18, 2011 (JP) ................. 2011-252807

(51) Int. Cl.
*H02M 7/48* (2007.01)
*H02M 7/5387* (2007.01)
(Continued)

(52) U.S. Cl.
CPC ............ *H02M 7/48* (2013.01); *B60L 3/0046* (2013.01); *B60L 3/04* (2013.01); *B60L 11/00* (2013.01); *H02M 7/53871* (2013.01); *H02P 27/06* (2013.01); *B60L 2210/40* (2013.01); *H02M 7/5395* (2013.01); *H02M 2001/322* (2013.01); *Y02T 10/7241* (2013.01)

(58) Field of Classification Search
CPC ........ Y02T 10/00; B60L 1/00; B60L 2200/00; B60L 2210/00; H02M 1/00
See application file for complete search history.

(56) References Cited

U.S. PATENT DOCUMENTS 6,002,221 A * 12/1999 Ochiai .................. B60L 3/0023
  318/139
8,612,073 B2  12/2013 Fuji et al.
(Continued)

FOREIGN PATENT DOCUMENTS

| JP | 6-225543 A | 8/1994 |
| JP | 11-308704 A | 11/1999 |

(Continued)

OTHER PUBLICATIONS

Corresponding International Search Report with English Translation dated Feb. 12, 2013 (four (4) pages).

*Primary Examiner* — Shawki S Ismail
*Assistant Examiner* — Zoheb Imtiaz
(74) *Attorney, Agent, or Firm* — Crowell & Moring LLP

(57) ABSTRACT

A power conversion apparatus includes a power conversion element; a capacitor; a control circuit that outputs a control signal to control operation of the power conversion element at the time of driving a load; a discharge control unit that outputs a discharge control signal to control operation of the power conversion element at the time of discharging the capacitor; a power supply circuit that generates a power supply voltage, on the basis of a voltage between both ends of the capacitor; and a driver unit that outputs a driving signal to operate the power conversion element, on the basis of the control signal or the discharge control signal. The power conversion element is operated according to the discharge control signal, a current is flown from the capacitor to the load through the power conversion element, and the capacitor is discharged.

16 Claims, 9 Drawing Sheets

(51) Int. Cl.
    *B60L 11/00*     (2006.01)
    *H02P 27/06*     (2006.01)
    *B60L 3/00*     (2006.01)
    *B60L 3/04*     (2006.01)
    H02M 7/5395     (2006.01)
    H02M 1/32     (2007.01)

(56) References Cited

U.S. PATENT DOCUMENTS

| | | | |
|---|---|---|---|
| 2010/0214055 A1* | 8/2010 | Fuji | B60L 3/00 340/3.1 |
| 2012/0020136 A1* | 1/2012 | Akaishi | B60L 11/1851 363/131 |
| 2012/0049773 A1* | 3/2012 | Muraho | H02P 27/06 318/400.3 |
| 2012/0056599 A1* | 3/2012 | Robarge | H01T 2/02 320/166 |
| 2012/0098470 A1* | 4/2012 | Itou | H02P 27/06 318/139 |
| 2013/0033914 A1 | 2/2013 | Yahata et al. | |
| 2014/0239870 A1* | 8/2014 | Nawa | H02M 7/53871 318/503 |

FOREIGN PATENT DOCUMENTS

| | | |
|---|---|---|
| JP | 2003-348856 A | 12/2003 |
| JP | 2010-193691 A | 9/2010 |
| JP | 2010-206909 A | 9/2010 |
| JP | 2011-234507 A | 11/2011 |

\* cited by examiner

POWER CONVERSION APPARATUS

TECHNICAL FIELD

The present invention relates to a power conversion apparatus that converts direct-current power supplied from a direct-current power supply into alternating-current power.

BACKGROUND ART

In the related art, in a power conversion apparatus that converts direct-current power supplied from a direct-current power supply into alternating-current power, a smoothing capacitor that suppresses a voltage variation of the direct-current power from being generated due to switching operation at the time of converting power and smoothes the direct-current power is provided. Technology for discharging charges accumulated in the smoothing capacitor when high voltage DC side is separated in the power conversion apparatus has been known.

For example, in PTL 1, technology for allowing a motor control mechanism in a microcomputer to switch a switching element of an inverter circuit, flowing a current to an external load, and discharging charges accumulated in a smoothing capacitor, when a main contactor is turned off, has been disclosed.

In addition, in PTL 2, technology for connecting an external discharge resistor and a switching element between both ends of a smoothing capacitor and establishing electrical continuity with the switching element and starting discharge, according to a discharge signal output only when the discharge is necessary, has been disclosed.

CITATION LIST

Patent Literature

PTL 1: JP 11-308704 A
PTL 2: JP 2010-206909 A

SUMMARY OF INVENTION

Technical Problem

However, according to the technology disclosed in PTL 1, the discharge of the smoothing capacitor is disabled, when a power supply of the microcomputer is lost. Meanwhile, according to the technology disclosed in PTL 2, it is necessary to mount the external discharge resistor and the switching element to be expensive that can withstand a large current flowing at the time of the discharge of the smoothing capacitor and it is necessary to provide a structure for making heat generated from the external discharge resistor at the time of the discharge dissipated in the power conversion apparatus. For this reason, a cost of the power conversion apparatus increases.

The invention has been made in view of the above-described problems according to the related art and an object of the invention is to realize a power conversion apparatus in which discharge control of a smoothing capacitor is enabled even when a control power supply is lost, with a cheap circuit configuration.

Solution to Problem

A power conversion apparatus according to one aspect of the present invention includes: a power conversion element that converts direct-current power supplied from a direct-current power supply into alternating-current power and supplies the alternating-current power to a load; a capacitor that smoothes the direct-current power; a control circuit that outputs a control signal to control operation of the power conversion element at the time of driving the load; a discharge control unit that outputs a discharge control signal to control operation of the power conversion element at the time of discharging the capacitor; a power supply circuit that generates a power supply voltage to operate the discharge control unit, on the basis of a voltage between both ends of the capacitor; and a driver unit that outputs a driving signal to operate the power conversion element, on the basis of the control signal or the discharge control signal, wherein the power conversion element is operated according to the discharge control signal, a current is flown from the capacitor to the load through the power conversion element, and the capacitor is discharged.

Advantageous Effects of Invention

According to the present invention, a power conversion apparatus in which discharge control of a smoothing capacitor is enabled even when a control power supply is lost can be realized with a cheap circuit configuration.

DESCRIPTION OF EMBODIMENTS

Hereinafter, a power conversion apparatus according to an embodiment of the present invention will be described in detail with reference to the drawings. The present invention can be applied to a power conversion apparatus that is mounted to a vehicle and converts direct-current power supplied from a vehicle mounted battery into alternating-current power. In particular, the present invention is suitable for a power conversion apparatus that outputs alternating-current power after conversion to an auxiliary machine driving motor or a vehicle driving motor, in an auxiliary machine driving electric machinery system or a vehicle driving electric machinery system mounted to a hybrid vehicle, a plug-in hybrid vehicle, and a pure electric vehicle. However, the present invention can be applied to power conversion apparatuses of any forms that can convert direct-current power supplied from a direct-current power supply into alternating-current power, in addition to the power conversion apparatuses mounted to the vehicles.

Hereinafter, as a representative example of a power conversion apparatus according to the present invention, an example of the case in which the present invention is applied to a power conversion apparatus mounted to a hybrid vehicle will be described.

In a general hybrid vehicle, a motor and an internal combustion engine become a main motive power source and one or more motors are mounted as the motor. The power conversion apparatus according to the present invention is used as a vehicle mounted power conversion apparatus in a vehicle mounted electric machinery system mounted to the hybrid vehicle, particularly, a vehicle driving inverter. A vehicle driving inverter device is included as a control device to control driving of a vehicle driving motor in a vehicle driving electric machinery system. The vehicle driving inverter device converts direct-current power supplied from a vehicle mounted battery or a vehicle mounted power generation device constituting a vehicle mounted power supply into predetermined alternating-current power, supplies the obtained alternating-current power to the vehicle driving motor, and controls the driving of the vehicle driving motor. In addition, because the vehicle driving motor also has a function as a generator, the vehicle driving inverter device also has a function of converting alternating-current power generated by the vehicle driving motor into direct-current power, according to an operation mode. The converted direct-current power is supplied to the vehicle mounted battery.

Figure 1:
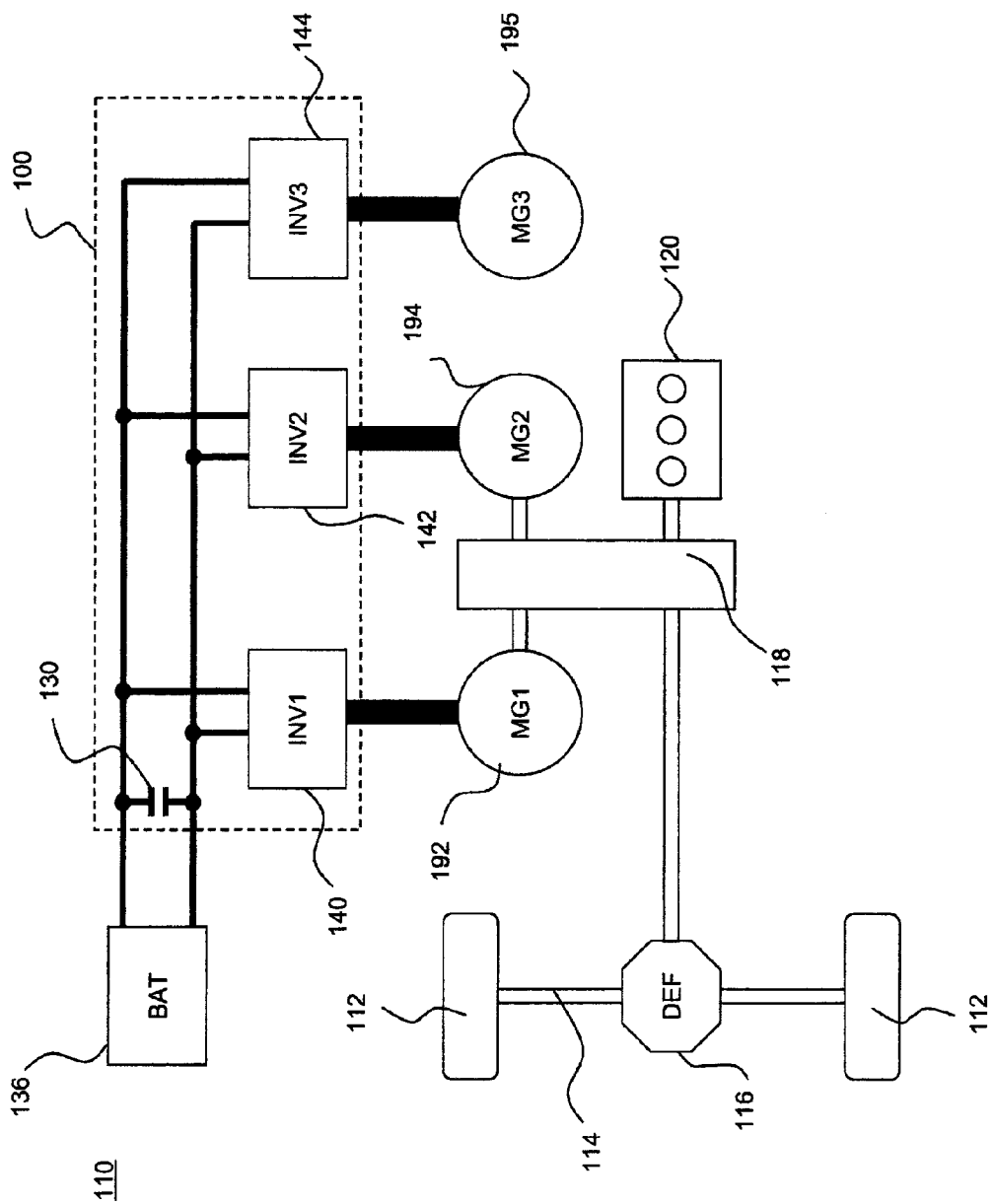
FIG. 1 is a control block diagram of a hybrid vehicle to which a power conversion apparatus according to an embodiment of the present invention is mounted.

FIG. 1 is a control block diagram of a hybrid vehicle to which a power conversion apparatus according to an embodiment of the present invention is mounted. In FIG. 1, a hybrid electric vehicle (hereinafter, referred to as the "HEV") 110 is an electrically driven vehicle and includes two vehicle driving systems. One of the two vehicle driving systems is an engine system that uses an engine 120 to be an internal combustion engine as a motive power source. The engine system is mainly used as a driving source and a power generation source of the HEV 110. The other is a vehicle mounted electric machinery system that uses motor generators 192 and 194 as a motive power source. The vehicle mounted electric machinery system is mainly used as a driving source of the HEV 110 and a power generation source of the HEV 110. The motor generators 192 and 194 are, for example, synchronous machines or induction machines and because the motor generators 192 and 194 are operated as motors or generators according to an operation method, the motor generators 192 and 194 are described as motor generators herein. As the motor generator, one or two motor generators are generally mounted. However, two or more motor generators may be mounted.

A front wheel axle 114 is pivotally supported to a front portion of a vehicle body to be rotatable. A pair of front wheels 112 is provided in both ends of the front wheel axle 114. A rear wheel axle (not illustrated in the drawings) is pivotally supported to a rear portion of the vehicle body to be rotatable. A pair of rear wheels is provided in both ends of the rear wheel axle. In the HEV according to this embodiment, a so-called front wheel driving method in which main wheels driven by motive power are set as the front wheels 112 and driven wheels rotated together are set as the rear wheels is adopted. However, a driving method opposite to the front wheel driving method, that is, a rear wheel driving method may be adopted.

In a center portion of the front wheel axle 114, a front wheel side differential gear (hereinafter, referred to as the "front wheel side DEF") 116 is provided. The front wheel axle 114 is mechanically connected to an output side of the front wheel side DEF 116. An output shaft of a transmission 118 is mechanically connected to an input side of the front wheel side DEF 116. The front wheel side DEF 116 is a differential motive power distribution mechanism for distributing rotational driving force changed and transmitted by the transmission 118 to the left and right sides of the front wheel axle 114. Output sides of the motor generators 192 and 194 and the engine 120 are mechanically connected to an input side of the transmission 118. The transmission 118 includes a motive power distribution mechanism and the output side of the engine 120 and the output sides of the motor generators 192 and 194 are mechanically connected therethrough. A motive power distribution function of the transmission 118 has a function of mechanically connecting or separating the engine 120 and the motor generators 192 and 194. According to kinds of transmissions, the motor generators 192 and 194 may be mounted in the transmission.

The motor generators 192 and 194 are synchronous machines including a permanent magnet in a rotor or induction machines including an armature winding. Alternating-current power supplied to an armature winding of a stator is controlled by inverter devices 140 and 142, so that driving of the motor generators 192 and 194 is controlled. A battery 136 is electrically connected to the inverter devices 140 and 142 and power can be exchanged between the battery 136 and the inverter devices 140 and 142.

The vehicle mounted electric machinery system of FIG. 1 described above includes two electric power generation units of a first electric power generation unit that includes the motor generator 192 and the inverter device 140 and a second electric power generation unit that includes the motor generator 194 and the inverter device 142, which are used selectively according to an operation state of the HEV 110. For example, when driving torque of the HEV 110 is assisted by motive power from the engine 120, the second electric power generation unit is used as a power generation unit to generate power by the motive power of the engine 120 and the first electric power generation unit is actuated as an electric unit by power obtained by the power generation. In addition, for example, when a vehicle speed of the HEV 110 is assisted, the first electric power generation unit is used as a power generation unit to generate power by the motive power of the engine 120 and the second electric power generation unit is actuated as an electric unit by power obtained by the power generation.

In addition, the vehicle mounted electric machinery system of FIG. 1 actuates the first electric power generation unit or the second electric power generation unit as the electric unit by the power of the battery 136 to operate the motor generator 192 or 194 as the motor and can drive the HEV 110 using motive power generated as a result thereof. At this time, the motor generators 192 and 194 act as loads for the battery 136. In addition, the vehicle mounted electric machinery system actuates the first electric power generation unit or the second electric power generation unit as the power generation unit by the motive power of the engine 120 or the motive power from the front wheel 112 to operate the motor generator 192 or 194 as the generator and can perform charging of the battery 136 using power generated as a result thereof. At this time, the motor generators 192 and 194 act as power supply sources for the battery 136.

The battery 136 is also used as a power supply to drive a motor 195 for an auxiliary machine. The motor 195 for the auxiliary machine is, for example, a motor to drive a compressor of an air conditioner or a motor to drive a hydraulic pump for control. Direct-current power is supplied from the battery 136 to an inverter device 144 and is converted into alternating-current power by the inverter device 144 and the alternating-current power is supplied to the motor 195. The inverter device 144 has the same function as the inverter devices 140 and 142 and controls a phase, a frequency, and power of an alternating current supplied to the motor 195. For example, the alternating-current power of a leading phase is supplied from the inverter device 144 to the motor 195 with respect to the rotation of the rotor of the motor 195, so that the motor 195 generates torque. On the other hand, the alternating-current power of a lagging phase supplied from the inverter device 144 to the motor 195 is generated, so that the motor 195 acts as the generator and operates in a regenerative braking state. The control function of the inverter device 144 is the same as the control function of the inverter devices 140 and 142. Because the capacity of the motor 195 is smaller than the capacity of the motor generator 192 or 194, maximum conversion power of the inverter device 144 is smaller than maximum conversion power of the inverter device 140 or 142, but the circuit configuration of the inverter device 144 is basically the same as the circuit configuration of the inverter device 140 or 142.

A capacitor module 130 is connected between the inverter devices 140, 142, and 144 and the battery 136. The capacitor module and the inverter devices have an electrically close relation with each other and a countermeasure against heat generation is commonly necessary for the capacitor module and the inverter devices. Generally, in the power conversion apparatus, it is desirable to minimize the volume thereof. From these points, in a power conversion apparatus 100 according to this embodiment to be described in detail below, the inverter devices 140, 142, and 144 and the capacitor module 130 are housed in a common casing. By this configuration, a power conversion apparatus that has a small size and high reliability can be realized. A switching device (not illustrated in the drawings) to supply or intercept the direct-current power from the battery 136 is mounted between the inverter device 140 and the battery 136. This switching device is, for example, a contactor.

As described above, the inverter devices 140, 142, and 144 and the capacitor module 130 are housed as one power conversion apparatus 100 in the common casing, so that wiring simplification and noise reduction can be realized. In addition, because inductance of a connection circuit between the capacitor module 130 and the inverter devices 140, 142, and 144 can be decreased, a spike voltage can be decreased and reduction in heat generation and an improvement in heat radiation efficiency can be realized.

Next, an electric circuit configuration of the inverter devices 140 and 142 or the inverter device 144 will be described. Here, the case in which the inverter devices 140 and 142 or the inverter device 144 is individually configured will be described as an example. The inverter devices 140 and 142 or the inverter device 144 performs the same action with the same configuration and has the same function. For this reason, the inverter device 140 will be described as a representative example hereinafter.

Figure 2:
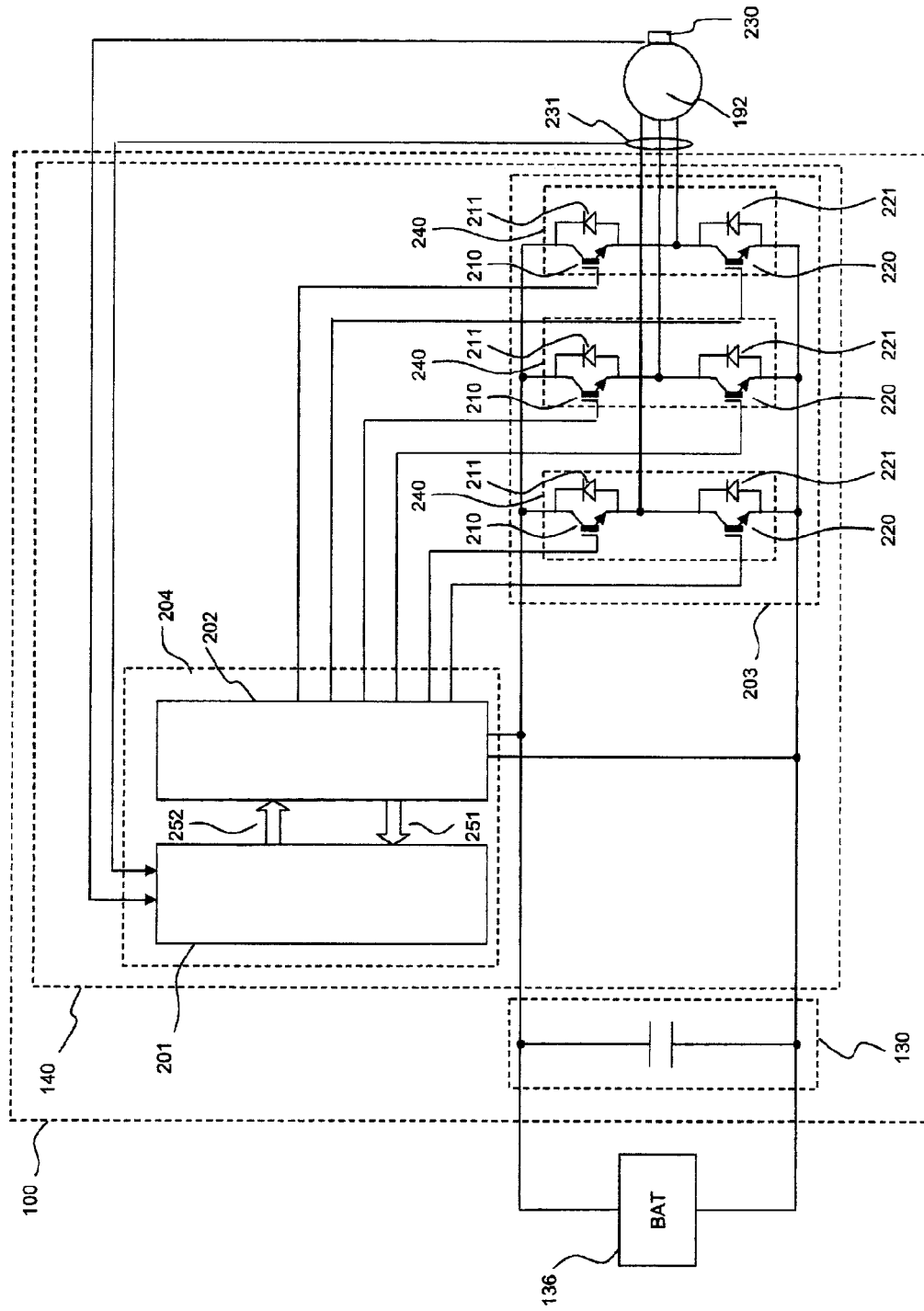
FIG. 2 is a block diagram of the power conversion apparatus according to the embodiment of the present invention.

FIG. 2 is a block diagram of the power conversion apparatus 100 according to the embodiment of the present invention. The power conversion apparatus 100 according to this embodiment includes the inverter device 140 and the capacitor module 130. The inverter device 140 has a power module unit 203 and a control unit 204. The power module unit 203 has a plurality of upper and lower arm series circuits 240 (in an example of FIG. 2, three upper and lower arm series circuits corresponding to individual phase windings of the armature winding of the motor generator 192 to be a three-phase alternating-current motor). Each upper and lower arm series circuit 240 includes an insulating gate bipolar transistor (IGBT) 210 and a diode 211 that are arranged at a high voltage side with respect to the battery 136 and operate as an upper arm and an IGBT 220 and a diode 221 that are arranged at a low voltage side and operate as a lower arm. An intermediate portion of each upper and lower arm series circuit 240 is connected to an alternating-current power line leading to the motor generator 192 through an alternating-current terminal. The control unit 204 has a driver circuit 202 that outputs a driving signal to control driving of the power module unit 203 and a control circuit 201 that supplies a control signal to cause the driver circuit 202 to output the driving signal through a motor generator driving signal line 252.

Each of the IGBT 210 of the upper arm and the IGBT 220 of the lower arm constituting each upper and lower arm series circuit 240 is a power semiconductor element for switching. The power semiconductor element executes switching operation according to a driving signal output from the control unit 204, so that direct-current power supplied from the battery 136 is converted into three-phase alternating-current power. The converted power is supplied to the armature winding of the motor generator 192. As the power semiconductor element for the switching, instead of the IGBT, a metal-oxide semiconductor field-effect transistor (MOSFET) may be used. In this case, the diodes 211 and 221 become unnecessary.

The capacitor module 130 constitutes a smoothing circuit to suppress a variation of a direct-current voltage generated by the switching operation of the IGBTs 210 and 220. A positive electrode side of the battery 136 is electrically connected to a positive electrode side capacitor electrode of the capacitor module 130 through a direct-current connector (not illustrated in the drawings) and a negative electrode side of the battery 136 is electrically connected to a negative electrode side capacitor electrode of the capacitor module 130 through the direct-current connector. Thereby, the capacitor module 130 is connected electrically to and in parallel to the battery 136 and the upper and lower arm series circuit 240.

In the control unit 204, the control circuit 201 generates control signals according to timings of the switching operation of the IGBTs 210 and 220 at the time of driving the motor generator 192, on the basis of input information from other control devices or sensors, and outputs the control signals to the driver circuit 202. The driver circuit 202 generates driving signals to cause the IGBTs 210 and 220 to execute the switching operation, on the basis of the control signals output from the control circuit 201, and outputs the driving signals to each upper and lower arm series circuit 240 of the power module unit 203.

The control circuit 201 includes a microcomputer to arithmetically process the switching timings of the IGBTs 210 and 220. A target torque value or a target rotational frequency value required for the motor generator 192, a value of a current supplied from each upper and lower arm series circuit 240 to the armature winding of the motor generator 192, and a position of a magnetic pole of the rotor of the motor generator 192 are input as the input information to the microcomputer. The target torque value or the target rotational frequency value is based on a command signal output from an upper control device not illustrated in the drawings. Alternatively, a value arithmetically calculated in the microcomputer may be used as the target torque value or the target rotational frequency value. The current value is detected on the basis of a detection signal output from a current sensor 231. The magnetic pole position is detected on the basis of a detection signal output from a rotary magnetic pole sensor 230 provided in the motor generator 192. In this embodiment, the case in which the current values for the three phases are detected has been described as the example. However, current values for two phases may be detected.

The microcomputer in the control circuit 201 arithmetically calculates a d and q-axis vector current command of the motor generator 192, on the basis of the target torque value or the target rotational frequency value input as the input information. Next, the microcomputer arithmetically calculates a d and q-axis vector voltage command, on the basis of a difference of the arithmetically calculated d and q-axis vector current command and a d and q-axis current value detected by the current sensor 231. In addition, the microcomputer converts the arithmetically calculated d and q-axis vector voltage command into voltage command values of a U phase, a V phase, and a W phase, on the basis of the magnetic pole position detected by the rotary magnetic pole sensor 230. The microcomputer executes pulse conversion on a fundamental wave (sine wave) based on the voltage command values of the U phase, the V phase, and the W phase obtained in the above-described manner, on the basis of a predetermined carrier wave, to generate a pulsed modulation wave, and outputs the generated modulation wave as a pulse width modulation (PWM) control signal from a motor generator driving signal line 252 to the driver circuit 202. Here, the control method of the motor based on the general PWM modulation method has been described as the example. However, the control signal to drive the motor generator 192 is not limited to generation based on the PWM modulation method and may be generated on the basis of any control method.

When the driver circuit 202 drives the lower arm, the driver circuit 202 amplifies the PWM control signal from the control circuit 201 and outputs the PWM control signal as a driving signal to a gate electrode of the IGBT 220 of the lower arm. In addition, when the driver circuit 202 drives the upper arm, the driver circuit 202 shifts a level of a reference potential to a level of a reference potential of the upper arm, amplifies the PWM control signal from the control circuit 201, and outputs the PWM control signal as a driving signal to a gate electrode of the IGBT 210 of the upper arm. Thereby, the individual IGBTs 210 and 220 execute the switching operation according to the input driving signals.

In addition, the driver circuit 202 executes abnormality detection (an overcurrent, an overvoltage, an overtemperature, and the like) in the upper and lower arm series circuit 240 and protects the upper and lower arm series circuit 240. If the driver circuit 202 detects some kind of abnormality, the driver circuit 202 stops the operation of the upper and lower arm series circuit 240 and protects the upper and lower arm series circuit 240 from the abnormality. In addition, the driver circuit 202 transmits a predetermined abnormality signal to the microcomputer of the control circuit 201 through an abnormality signal line 251 to report the abnormality detection to the microcomputer.

Next, discharge control of the capacitor module 130 in the power conversion apparatus 100 configured as described above will be described. If the power conversion apparatus 100 is separated from the battery 136 and the direct-current power is intercepted, the power conversion apparatus 100 performs the discharge control to discharge the capacitor module 130 in the control unit 204. Hereinafter, circuit configuration examples of the control unit 204 to realize the discharge control will be described as first and second examples.

First Example

Figure 3:
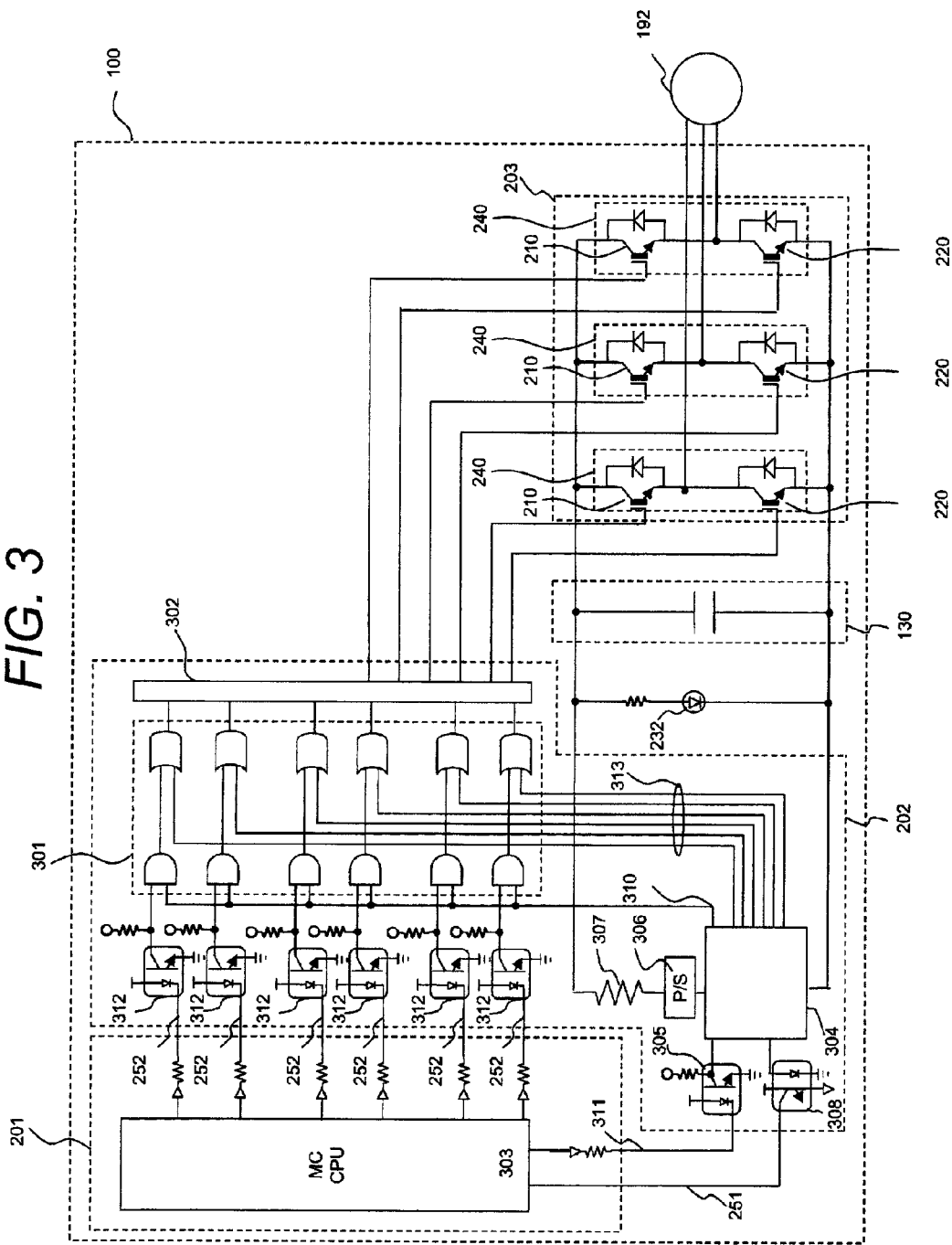
FIG. 3 is a diagram illustrating a circuit configuration of a control unit in a first example.

FIG. 3 is a diagram illustrating a circuit configuration in a first example of the control unit 204. As illustrated in FIG. 3, the control circuit 201 in the control unit 204 includes a microcomputer 303 to arithmetically process the switching timings of the IGBTs 210 and 220. The microcomputer 303 executes the above-described arithmetic process and generates a PWM control signal with respect to the upper and lower arms of each of the U phase, the V phase, and the W phase. Each PWM control signal that is generated in the microcomputer 303 is output from the microcomputer 303 to the driver circuit 202 through six motor generator driving signal lines 252.

If a key switch of the HEV 110 is turned off, the microcomputer 303 or an upper controller (not illustrated in the drawings) mounted to the HEV 110 controls the operation of the above-described switching device, so that the power conversion apparatus 100 is separated from the battery 136 and the direct-current power is intercepted. At this time, the microcomputer 303 outputs a pulsed discharge command signal to the driver circuit 202 through the discharge command signal line 311. The discharge command signal is a signal to instruct the driver circuit 202 to perform discharge of the capacitor module 130 and shows permission and prohibition of the discharge by a change of a pulse train. For example, when the direct-current power from the battery 136 is supplied, a pulse train of which a duty ratio is 60% (60% ON and 40% OFF) at a predetermined pulse width is continuously output as a discharge command signal showing the prohibition of the discharge. Meanwhile, when the direct-current power from the battery 136 is intercepted, a pulse train of which a duty ratio is 40% (40% ON and 60% OFF) at a predetermined pulse width is continuously output as a discharge command signal showing the permission of the discharge. Because the pulse train described herein is only exemplary, the permission and prohibition of the discharge may be shown using other pulse train as the discharge command signal.

In addition, as described earlier in FIG. 2, the control signal that is output from the control circuit 201 to the driver circuit 202 to drive the motor generator 192 is not limited to the signal based on the PWM modulation method and may be any kind of signal. FIG. 3 illustrates a circuit configuration example in which the six kinds of PWM control signals generated by the control circuit 201 are output to the driver circuit 202 through the six motor generator driving signal lines 252, when the motor generator 192 is a three-phase alternating-current motor. However, the motor generator 192 may be a single-phase alternating-current motor or a polyphase alternating-current motor other than the three-phase alternating-current motor. In this case, the control signal generated by the control circuit 201 and the number of motor generator driving signal lines 252 may be changed according to the number of phases of the motor generator 192.

The driver circuit 202 includes six photocouplers 312 provided for the individual motor generator driving signal lines 252, a logic circuit 301, a power driver 302, a discharging microcomputer 304, a power supply circuit 306, a voltage dividing resistor 307, a photocoupler 305 provided for the discharge command signal line 311, and a photocoupler 308 provided for an abnormality signal line 251.

Each PWM control signal that is input from the microcomputer 303 of the control circuit 201 to the driver circuit 202 through the motor generator driving signal line 252 is input to the logic circuit 301 through the photocoupler 312. In the logic circuit 301, six AND circuits and six OR circuits are provided at a front step side and a rear step side, respectively, to correspond to the individual PWM control signals. Each AND circuit of the front step side executes logical operation to pass or intercept each PWM control signal, according to a discharge switching signal output from the discharging microcomputer 304 through a discharge switching signal line 310. Each OR circuit of the rear step side executes logical operation to output any one of each PWM control signal having passed through the AND circuit of the front step side and each discharge control signal output from the discharging microcomputer 304 through a discharge control signal line 313 to the power driver 302.

The power driver 302 is, for example, composed of one IC and amplifies each PWM control signal or each discharge control signal output from the logic circuit 301 and generates a driving signal. The individual driving signals that are generated by the power driver 302 are output to the IGBTs 210 and 220 of the individual upper and lower arm series circuits 240, respectively.

In FIG. 3, the example of the case in which the power driver 302 is composed of one IC is illustrated. However, the power driver 302 may be individually provided for each upper and lower arm series circuit 240. In this case, when the motor generator 192 is the three-phase alternating-current motor illustrated in FIG. 3, the three power drivers 302 are arranged in the driver circuit 202. The power driver 302 can be individually provided for each of the IGBTs 210 and 220. In this case, the six power drivers 302 are arranged in the driver circuit 202.

Meanwhile, the discharge command signal that is input from the microcomputer 303 of the control circuit 201 to the driver circuit 202 through the discharge command signal line 311 is input to the discharging microcomputer 304 through the photocoupler 305. The discharge command signal is the pulsed signal as described above. As such, the pulsed discharge command signal is used, so that abnormality of the microcomputer 303 can be recognized by the discharging microcomputer 304, when the microcomputer 303 is not normally operated in the control circuit 201 by a cause such as power supply loss and a non-pulsed signal of a constant voltage is continuously output as a discharge command signal from the microcomputer 303. That is, the discharging microcomputer 304 determines an operation state of the control circuit 201, on the basis of the discharge command signal from the microcomputer 303. As a result, when it is determined that the control circuit 201 is not normally operated, the discharging microcomputer 304 outputs a discharge control signal.

When the discharge command signal showing the prohibition of the discharge is output from the microcomputer 303, the discharging microcomputer 304 makes a discharge switching signal output to the logic circuit 301 through the discharge switching signal line 310 become ON. Meanwhile, when the discharge command signal showing the permission of the discharge is output from the microcomputer 303, the discharging microcomputer 304 makes a discharge switching signal become OFF and outputs the discharge control signals with respect to the upper and lower arms of each of the U phase, the V phase, and the W phase to the logic circuit 301 through the six discharge control signal lines 313. In the logic circuit 301, the above-described logical operation is executed for each PWM control signal, on the basis of the discharge switching signals and the discharge control signals.

As a result obtained by determining the operation state of the control circuit 201 in the above-described manner, when it is determined that the pulsed discharge command signal is not output from the microcomputer 303 and the control circuit 201 is not normally operated, the discharging microcomputer 304 executes the same operation as the case in which the discharge is permitted. That is, the discharging microcomputer 304 makes the discharge switching signal become OFF and outputs the discharge control signal to the logic circuit 301.

A power supply voltage to operate the discharging microcomputer 304 is generated by the power supply circuit 306, on the basis of a voltage obtained by dividing a voltage between both ends of the capacitor module 130 by the voltage dividing resistor 307. For this reason, during a period until the capacitor module 130 is discharged and the voltage between both ends becomes a constant voltage or less, even after the direct-current power from the battery 136 is intercepted, the discharging microcomputer 304 can be operated and the discharge control can be executed.

An LED 232 that is connected in parallel to the capacitor module 130 is arranged between both ends of the capacitor module 130. The LED 232 is used to report whether the capacitor module 130 is discharged. That is, when the voltage between both ends of the capacitor module 130 is a predetermined value or more, the LED 232 emits light. Thereby, non-discharge is reported. Meanwhile, when the voltage between both ends of the capacitor module 130 is less than the predetermined value, the LED 232 does not emit light. Therefore, discharge completion is reported. In addition, it may be reported whether the capacitor module 130 is discharged, using other light emitting element, instead of the LED 232.

The discharging microcomputer 304 performs the abnormality detection, on the basis of sensing information output from the upper and lower arm series circuit 240. For example, information of a current flowing to an emitter electrode in the IGBTs 210 and 220 of each upper and lower arm series circuit 240 is output from an emitter electrode terminal for a signal provided in the IGBTs 210 and 220 and is input as sensing information to the discharging microcomputer 304. The discharging microcomputer 304 performs the overcurrent detection, on the basis of the sensing information. When the overcurrent is detected in any IGBT, the discharging microcomputer 304 makes a discharge switching signal become OFF. According to this, the PWM control signal from the control circuit 201 is intercepted in the logic circuit 301 to protect the upper and lower arm series circuit 240 from the overcurrent.

In addition, information of the voltage divided by the voltage dividing resistor 307 is input as sensing information to the discharging microcomputer 304. The discharging microcomputer 304 calculates the voltage between both ends of the capacitor module 130, on the basis of the information, and performs the overvoltage detection, on the basis of a calculation result thereof. When the overcurrent is detected, the discharging microcomputer 304 makes the discharge switching signal become OFF. According to this, the PWM control signal from the control circuit 201 is intercepted in the logic circuit 301 to protect the upper and lower arm series circuit 240 from the overvoltage.

A temperature sensor (not illustrated in the drawings) is provided in the upper and lower arm series circuit 240 and information of a temperature of the upper and lower arm series circuit 240 detected by the temperature sensor is input as sensing information to the discharging microcomputer 304. The discharging microcomputer 304 performs overtemperature detection, on the basis of the information. When the overtemperature is detected, the discharging microcomputer 304 makes the discharge switching signal become OFF. According to this, the PWM control signal from the control circuit 201 is intercepted in the logic circuit 301 to protect the upper and lower arm series circuit 240 from the overtemperature.

When the abnormality is detected, the discharging microcomputer 304 executes the above-described operation to protect the upper and lower arm series circuit 240 (and the entire power conversion apparatus 100 including the upper and lower arm series circuit 240) from the abnormality such as the overcurrent, the overtemperature, and the overvoltage. In addition, the discharging microcomputer 304 outputs an abnormality signal to the microcomputer 303 of the control circuit 201 through the photocoupler 308 and the abnormality signal line 251, thereby reporting generation of the abnormality.

In addition, the discharging microcomputer 304 determines whether the discharge is normally performed, on the basis of the voltage between both ends of the capacitor module 130 during the discharge, which is determined on the basis of the information of the voltage input as the sensing information to the discharging microcomputer 304. As a result, when it is determined that the discharge is not normally performed, the discharging microcomputer 304 stops the output of the discharge control signal and stops the discharge.

The function of the discharging microcomputer 304 described above may be realized using an IC other than the microcomputer. The discharging microcomputer 304 and the logic circuit 301 may be realized as an integrated configuration, using a logic device that can write any logic circuit, for example, a field programmable gate array (FPGA) or a programmable logic device (PLD).

Timing chart examples according to a discharge sequence in the first example of the control unit 204 described above are illustrated in FIGS. 5 to 8. In these drawings, a reference numeral 401 denotes a discharge command signal from the microcomputer 303 and reference numerals 402 and 403 denote a discharge switching signal and a discharge control signal from the discharging microcomputer 304, respectively. In addition, a reference numeral 404 denotes a capacitor voltage, that is, a voltage between both ends of the capacitor module 130 and a reference numeral 405 denotes a contactor state, that is, a supply state of direct-current power from the battery 136.

In the individual timing charts of FIGS. 5 to 8, it is assumed that the discharge command signal 401 shows the prohibition of the discharge by a pulse train signal of which a duty ratio is 60% (60% ON and 40% OFF), as described above. In addition, in contrast, it is assumed that the discharge command signal 401 shows the permission of the discharge by a pulse train signal of which a duty ratio is 40% (40% ON and 60% OFF).

Figure 5:
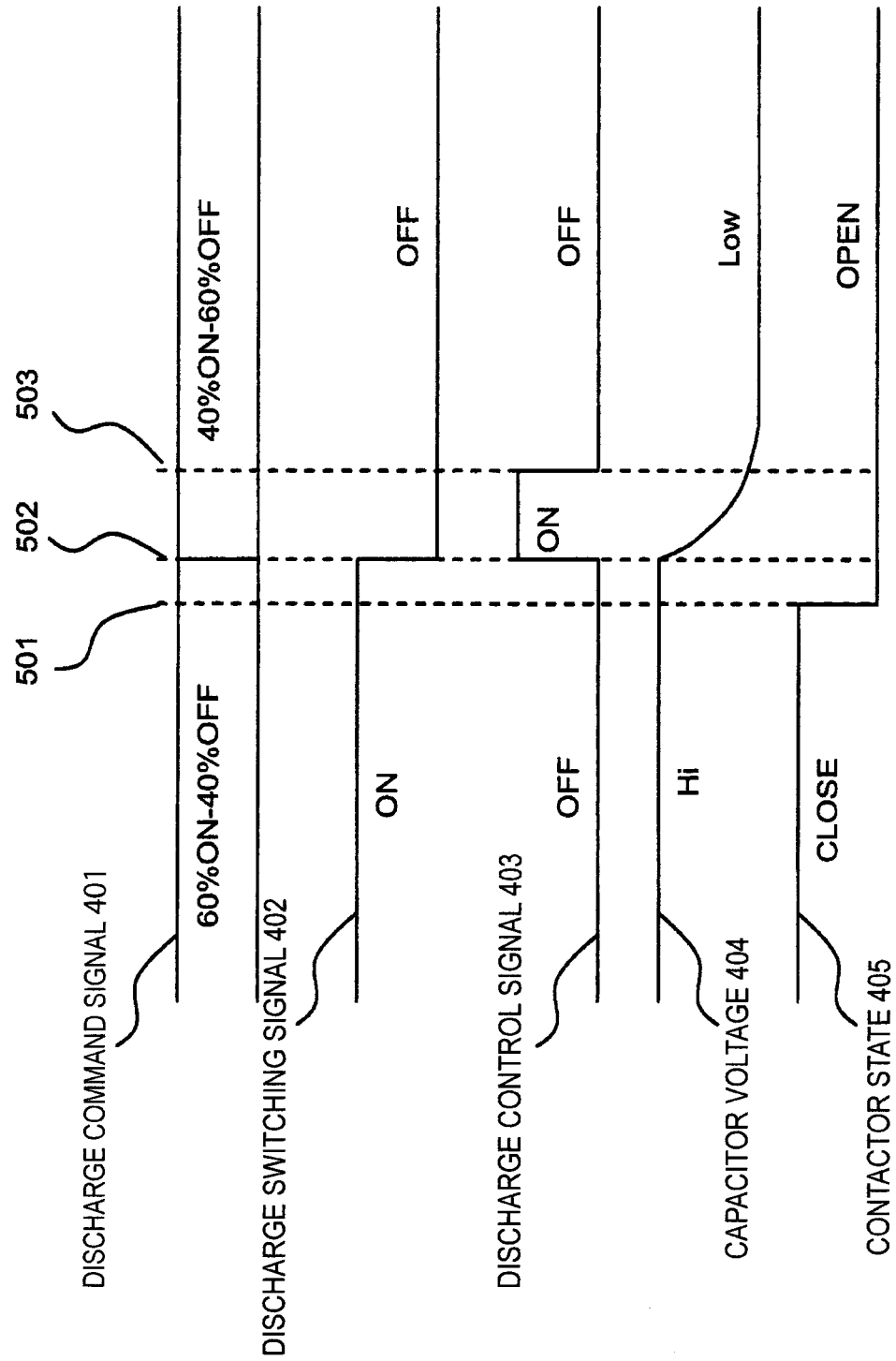
FIG. 5 illustrates a timing chart example of each signal at the time of normal discharge in the first example.

FIG. 5 illustrates a timing chart example of each signal when the discharge is normally performed. In FIG. 5, when the direct-current power from the battery 136 is supplied, the discharge command signal 401 showing the prohibition of the discharge is output from the microcomputer 303. According to the discharge command signal 401, the discharging microcomputer 304 makes the discharge switching signal 402 become ON and makes the discharge control signal 403 become OFF. Thereby, the PWM control signal from the control circuit 201 is output from the logic circuit 301 to the power driver 302 and each of the IGBTs 210 and 220 executes the switching operation according to the PWM control signal. At this time, because charges are accumulated in the capacitor module 130, the capacitor voltage 404 becomes Hi. In addition, the contactor state 405 becomes CLOSE.

At timing denoted by a reference numeral 501, if the switching device is opened and the direct-current power from the battery 136 is intercepted, the contactor state 405 changes from CLOSE to OPEN. Then, at timing denoted by a reference numeral 502, if the discharge command signal 401 from the microcomputer 303 changes from the prohibition of the discharge to the permission of the discharge, according to this, the discharging microcomputer 304 changes the discharge switching signal 402 from ON to OFF. Thereby, the PWM control signal from the control circuit 201 is intercepted in the logic circuit 301 and is not output to the power driver 302. The discharging microcomputer 304 makes the discharge control signal 403 become ON. At this time, the output discharge control signal 403 is a signal to make each of the IGBTs 210 and 220 execute the switching operation, such that the current flown by the charges accumulated in the capacitor module 130 is consumed in the motor generator 192 while a state in which the motor generator 192 is not driven is maintained. For example, a high-speed PWM signal which the motor generator 192 cannot follow can be output as the discharge control signal 403 from the discharging microcomputer 304, with respect to each phase of the U phase, the V phase, and the W phase. The generation of the high-speed PWM signal can be realized, for example, by comparing a fundamental wave changing cyclically at a frequency faster (higher) than a maximum rotational speed of the motor generator 192 and a carrier wave of a predetermined frequency.

The discharge control signal described above is output from the discharging microcomputer 304, so that the current can be flown from the capacitor module 130 to the motor generator 192 through each of the IGBTs 210 and 220, without driving the motor generator 192. As a result, the capacitor module 130 can be discharged by the motor generator 192 without affecting the behavior of the HEV 110.

As described above, if the discharge control signal 403 becomes ON and the discharge of the capacitor module 130 starts, the capacitor voltage 404 gradually decreases from Hi to Low. At timing denoted by a reference numeral 503, if the capacitor voltage 404 becomes a predetermined voltage or less, power cannot be supplied from the power supply circuit 306 to the discharging microcomputer 304 and the discharging microcomputer 304 loses a power supply and stops operation thereof. Thereby, the discharge control signal 403 becomes OFF and the discharge of the capacitor module 130 ends.

Figure 6:
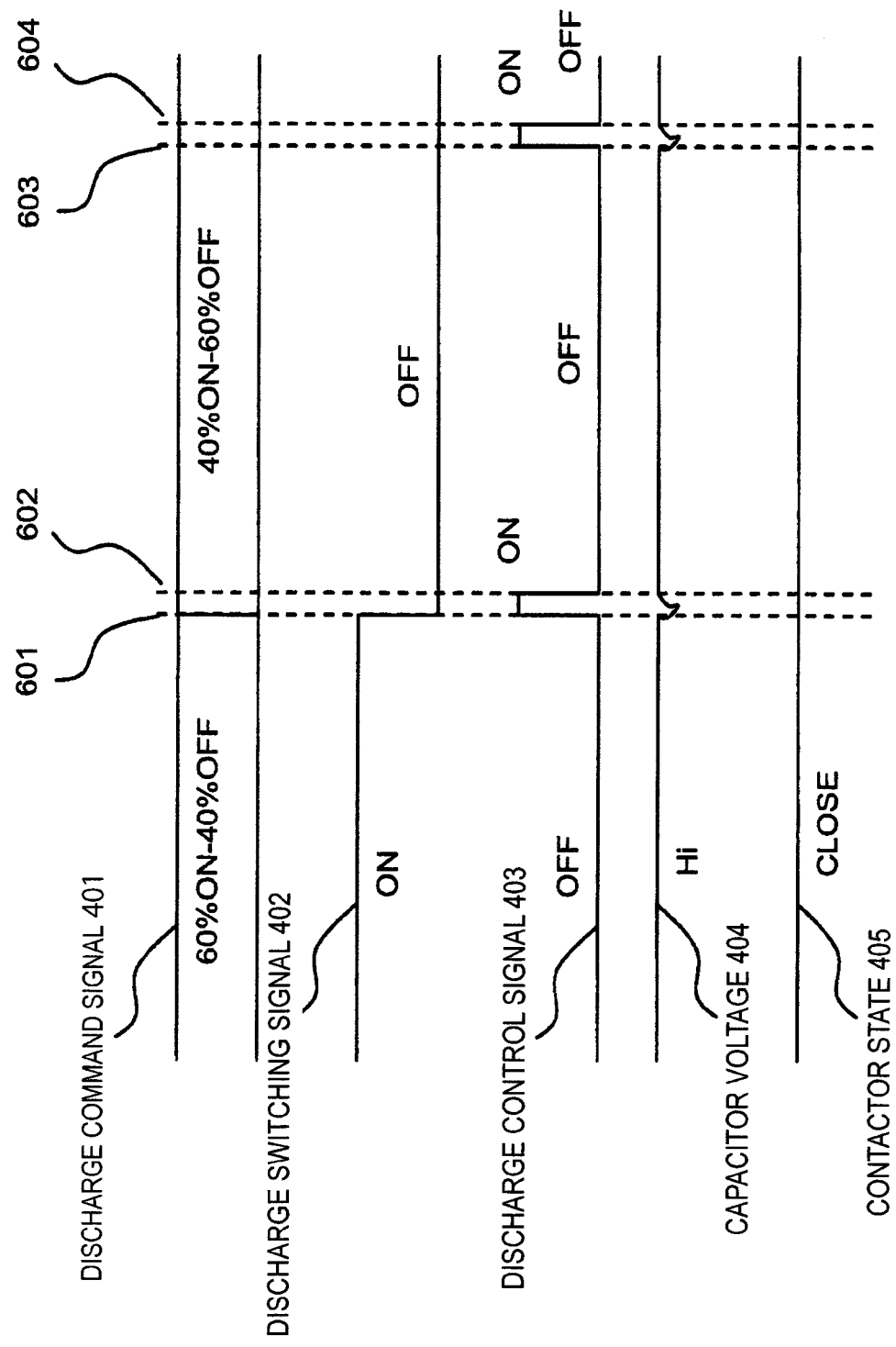
FIG. 6 illustrates a timing chart example of each signal at the time of contactor abnormality in the first example.

FIG. 6 illustrates a timing chart example of each signal when the contactor is abnormal. Here, the case in which the switching device cannot be normally operated by the contactor abnormality due to welding and the direct-current power from the battery 136 cannot be intercepted is assumed. In FIG. 6, when the direct-current power from the battery 136 is supplied, each signal state is the same as FIG. 5.

When the contactor is abnormal, the discharge command signal 401 from the microcomputer 303 changes from the prohibition of the discharge to the permission of the discharge at timing denoted by a reference numeral 601, even though the contactor state 405 does not change from CLOSE to OPEN. According to this, the discharging microcomputer 304 changes the discharge switching signal 402 from ON to OFF, makes the discharge control signal 403 become ON, and starts the discharge of the capacitor module 130, similar to FIG. 5. However, different from the case of FIG. 5, because the contactor state 405 does not change from CLOSE, the capacitor module 130 is not discharged and the capacitor voltage 404 decreases only for an instant from Hi, but does not decrease to Low. As such, if it is detected that the capacitor voltage 404 does not decrease even though the discharge control signal 403 is made to become ON, the discharging microcomputer 304 determines that the discharge is not normally performed in the capacitor module 130. In this case, at timing denoted by a reference numeral 602, the discharge control signal 403 is made to become OFF and the discharge of the capacitor module 130 is stopped.

After a constant period passes from the stop of the discharge as described above, at timing denoted by a reference numeral 603, the discharging microcomputer 304 makes the discharge control signal 403 become ON again. In this way, the discharging microcomputer 304 performs the discharge of the capacitor module 130 again after the constant period, such that the IGBTs 210 and 211 are not destructed by a high temperature. However, because the contactor state 405 is still CLOSE, the discharging microcomputer 304 determines that the discharge is not normally performed in the capacitor module 130, similar to the previous case. As a result, at timing denoted by a reference numeral 604, the discharge control signal 403 is made to become OFF and the discharge of the capacitor module 130 is stopped. The discharging microcomputer 304 repeats the above operation until the discharge of the capacitor module 130 is normally performed.

Figure 7:
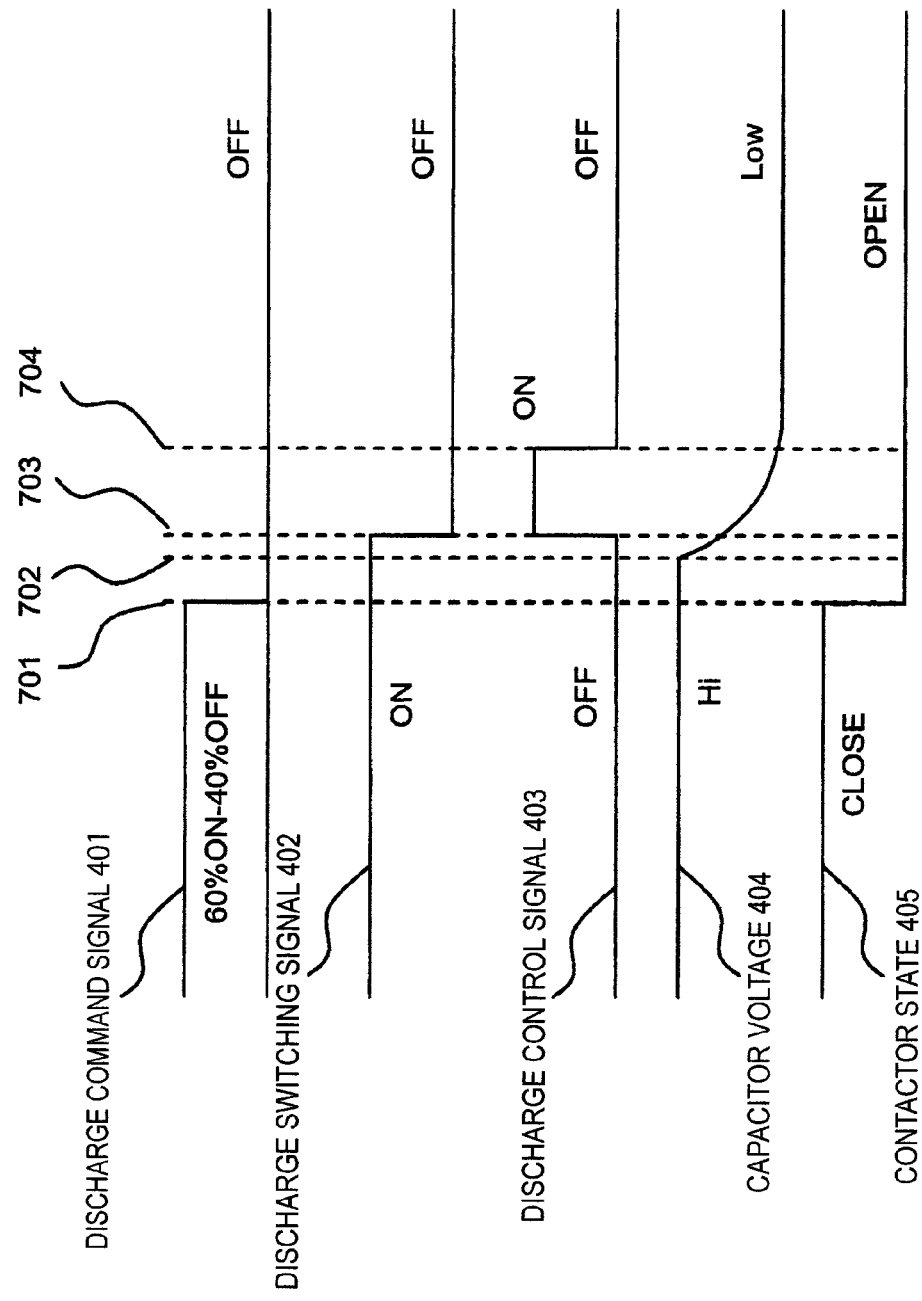
FIG. 7 illustrates a timing chart example of each signal at the time of control power supply loss in the first example.

FIG. 7 illustrates a timing chart example of each signal when a control power supply is lost. Here, the case in which a power supply of the control circuit 201 is lost by a cause such as disconnection and the operation of the microcomputer 303 is stopped, before the discharge of the capacitor module 130 starts, is assumed. In FIG. 7, each signal state while the microcomputer 303 normally operates is the same as FIGS. 5 and 6.

At timing denoted by a reference numeral 701, if the power supply of the control circuit 201 is lost, the discharge command signal 401 output from the microcomputer 303 until then and showing the prohibition of the discharge becomes an OFF state. At this time, if it is detected that the power supply of the control circuit 201 is lost, at timing denoted by a reference numeral 702, the upper controller (not illustrated in the drawings) mounted to the HEV 110 opens the switching device, changes the contactor state 405 from CLOSE to OPEN, and intercepts the direct-current power from the battery 136. Meanwhile, if it is detected that the discharge command signal 401 becomes OFF, at timing denoted by a reference numeral 703, the discharging microcomputer 304 changes the discharge switching signal 402 from ON to OFF, makes the discharge control signal 403 become ON, and starts the discharge of the capacitor module 130. In this case, similar to the case of FIG. 5, the capacitor voltage 404 gradually decreases from Hi to Low. Then, at timing denoted by a reference numeral 704, if the capacitor voltage 404 becomes the predetermined voltage or less, the power supply from the power supply circuit 306 to the discharging microcomputer 304 is disabled and the discharging microcomputer 304 loses the power supply and stops the operation thereof. Thereby, the discharge control signal 403 becomes OFF and the discharge of the capacitor module 130 ends.

Figure 8:
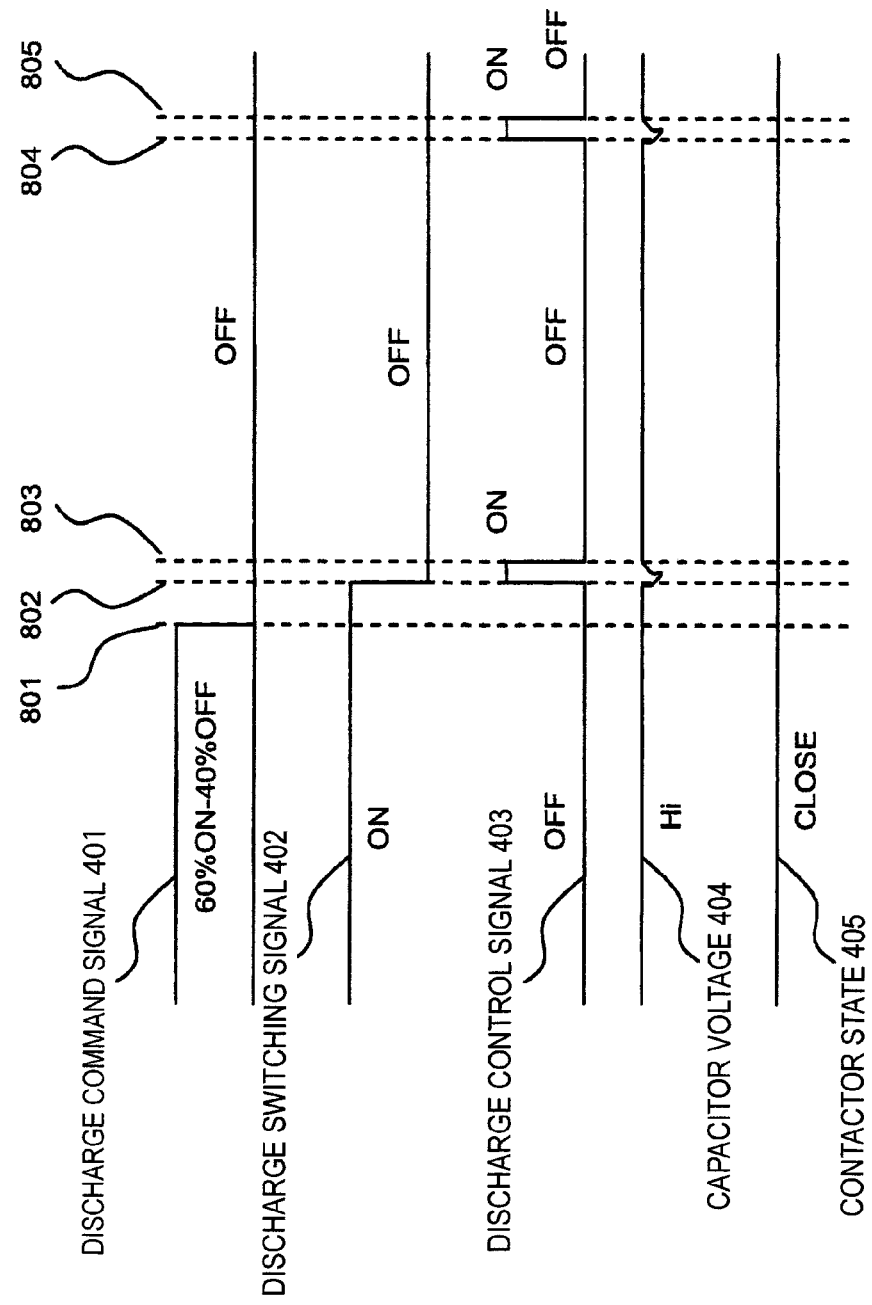
FIG. 8 illustrates a timing chart example of each signal at the time of control power supply loss and contactor abnormality in the first example.

FIG. 8 illustrates a timing chart example of each signal when the control power supply is lost and the contactor is abnormal. Here, the case in which a power supply of the control circuit 201 is lost, similar to the case of FIG. 7, and the contactor abnormality is generated, similar to the case of FIG. 6, before the discharge of the capacitor module 130 starts, is assumed. In FIG. 8, each signal state while the microcomputer 303 normally operates is the same as FIGS. 5 to 7.

At timing denoted by a reference numeral 801, if the power supply of the control circuit 201 is lost, similar to the case of FIG. 7, the discharge command signal 401 output from the microcomputer 303 until then and showing the prohibition of the discharge becomes an OFF state. However, different from the case of FIG. 7, the contactor state 405 does not change from CLOSE to OPEN, due to the contactor abnormality. Meanwhile, if it is detected that the discharge command signal 401 becomes OFF, at timing denoted by a reference numeral 802, the discharging microcomputer 304 changes the discharge switching signal 402 from ON to OFF, makes the discharge control signal 403 become ON, and starts the discharge of the capacitor module 130. However, similar to the case of FIG. 6, at this time, because the capacitor module 130 is not discharged, the capacitor voltage 404 decreases only for an instant from Hi, but does not decrease to Low. If this is detected, the discharging microcomputer 304 determines that the discharge is not normally performed in the capacitor module 130, as described in FIG. 6. In addition, at timing denoted by a reference numeral 803, the discharge control signal 403 is made to become OFF and the discharge of the capacitor module 130 is stopped.

If a constant period passes after the stop of the discharge, similar to the case of FIG. 6, at timing denoted by a reference numeral 804, the discharging microcomputer 304 makes the discharge control signal 403 become ON again and performs the discharge of the capacitor module 130 again. However, because the contactor state 405 is still CLOSE, the discharging microcomputer 304 determines that the discharge is not normally performed in the capacitor module 130. At timing denoted by a reference numeral 805, the discharging microcomputer 304 makes the discharge control signal 403 become OFF and stops the discharge of the capacitor module 130. Then, the discharging microcomputer 304 repeats the above operation.

In the first example, the control unit 204 performs the discharge control of the capacitor module 130 by the circuit configuration and the discharge sequence described above.

Second Example

Figure 4:
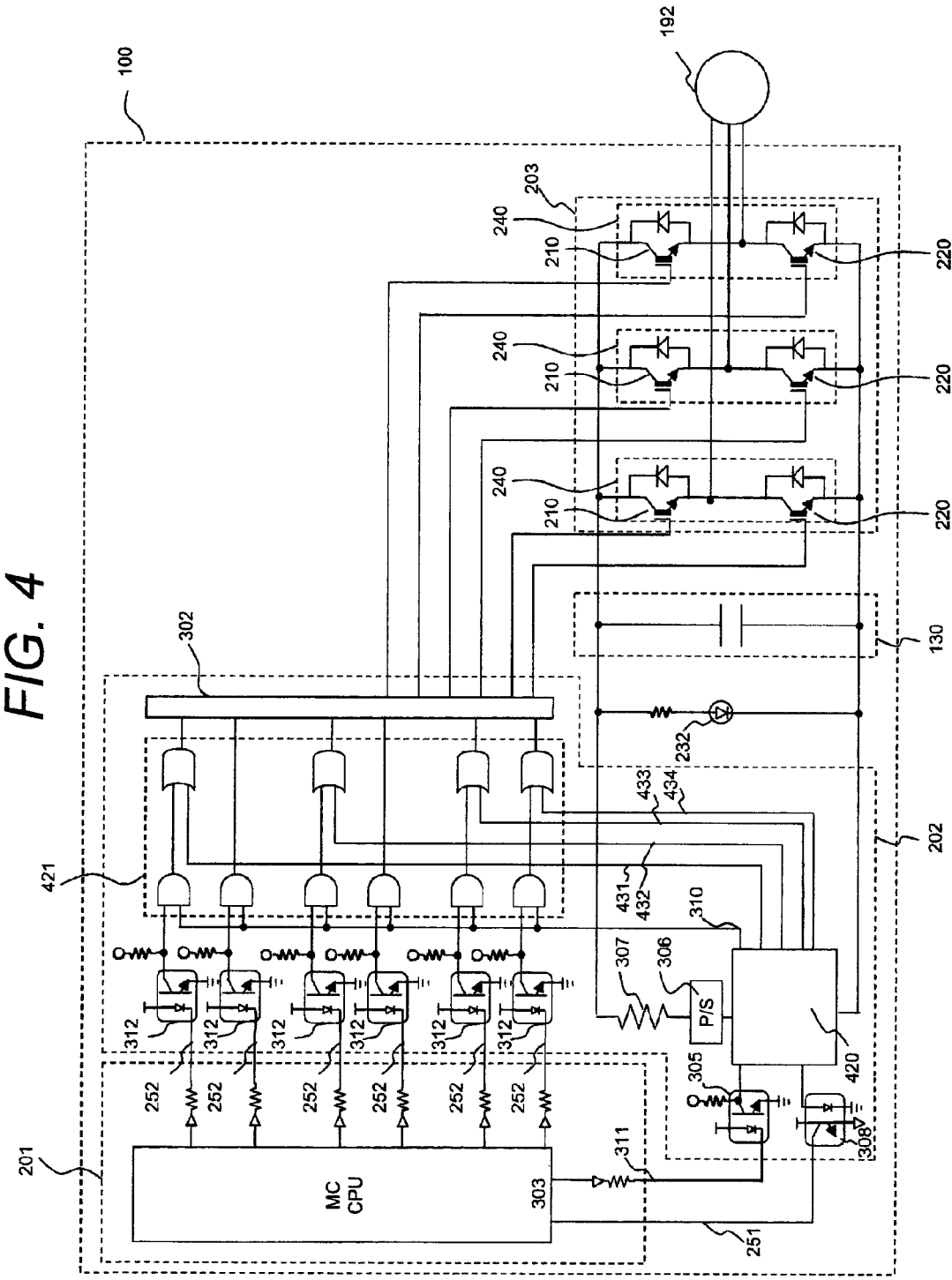
FIG. 4 is a diagram illustrating a circuit configuration of a control unit in a second example.

Next, a second example of the control unit 204 will be described. FIG. 4 is a diagram illustrating a circuit configuration in the second example of the control unit 204. If FIGS. 3 and 4 are compared with each other, the second example is different from the first example in that a discharging IC 420 and a logic circuit 421 are provided, instead of the discharging microcomputer 304 and the logic circuit 301 of FIG. 3. The other portions are the same as those in the first example.

Different from the discharging microcomputer 304, the discharging IC 420 cannot output the high-speed PWM signals described above as discharge control signals. Instead, the discharging IC 420 outputs discharge control signals by predetermined constant signal patterns through discharge control signal lines 431, 432, 433, and 434, respectively. The signal patterns of the discharge control signals will be described in detail below with reference to FIG. 9. A discharge switching signal output through a discharge switching signal line 310 is the same as that in the discharging microcomputer 304.

The logic circuit 421 is the same as the logic circuit 301 in that six AND circuits are provided at a front step side. However, the logic circuit 421 is different from the logic circuit 301 in that the number of OR circuits of a rear step side is four. Among these circuits, the three OR circuits are provided to correspond to individual IGBTs 210 of upper arms in individual phases of a U phase, a V phase, and a W phase. The remaining OR circuit is provided to correspond to an IGBT 220 of a lower arm in any one of the U phase, the V phase, and the W phase. The discharge control signals that are output from the discharging IC 420 through the discharge control signal lines 431, 432, 433, and 434 are input to the four OR circuits, respectively.

Figure 9:
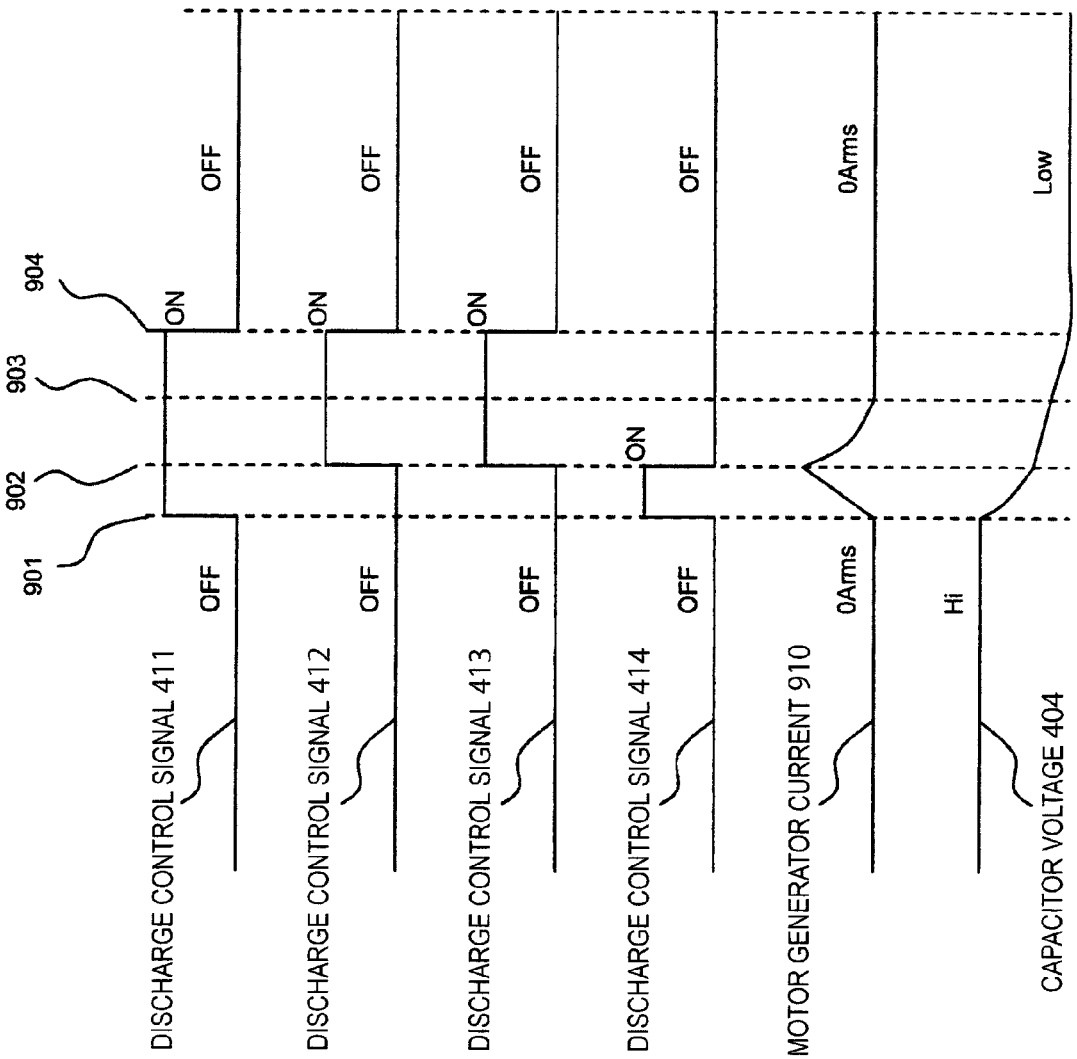
FIG. 9 illustrates a timing chart example of each signal in the second example.

FIG. 9 illustrates a timing chart example according to a discharge sequence in the second example of the control unit 204 described above. In FIG. 9, the individual discharge control signals that are output from the discharging IC 420 through the discharge control signal lines 431, 432, 433, and 434 are denoted by reference numerals 411, 412, 413, and 414, respectively. In addition, a current flowing to a motor generator 192 is denoted by a reference numeral 910 and a capacitor voltage, that is, a voltage between both ends of a capacitor module 130 is denoted by a reference numeral 404.

If a switching device is opened and direct-current power from a battery 136 is intercepted, the discharging IC 420 changes discharge control signals 411 and 414 from OFF to ON, at timing denoted by a reference numeral 901. In this case, the IGBT 210 of the upper arm in one phase among the U phase, the V phase, and the W phase and the IGBT 220 of the lower arm in another phase are supplied with power, the capacitor module 130 is discharged, and a current flows to the motor generator 192. Thereby, a motor generator current 910 increases and the capacitor voltage 404 gradually decreases.

Then, before the motor generator current 910 is more than an allowable current of the IGBTs 210 and 220, at timing denoted by a reference numeral 902, the discharging IC 420 changes the remaining discharge control signals 412 and 413 from OFF to ON and changes the discharge control signal 414 from ON to OFF. In this case, the IGBTs 210 of the upper arms in all of the U phase, the V phase, and the W phase are established electrical continuity and the motor generator current 910 flows back in the motor generator 192. As a result, the motor generator current 910 is gradually decreased by a resistance component and an inductance component of the motor generator 192 and becomes 0 Arms at timing denoted by a reference numeral 903.

Meanwhile, the power supply circuit 306 consumes power accumulated in the capacitor module 130 to supply the power to the discharging IC 420, so that the capacitor voltage 404 gradually decreases from Hi to Low. As a result, at timing denoted by a reference numeral 904, if the capacitor voltage 404 becomes a predetermined voltage or less, the power supply from the power supply circuit 306 to the discharging IC 420 is disabled and the discharging IC 420 loses the power supply and stops operation thereof. Thereby, the discharge control signals 411 to 413 become OFF and the discharge of the capacitor module 130 ends.

In the second example, the control unit 204 controls the discharge of the capacitor module 130 by the circuit configuration and the discharge sequence described above.

According to the embodiments described above, the following functions and effects can be achieved.

(1) The power conversion apparatus 100 includes the IGBTs 210 and 220 that convert the direct-current power supplied from the battery 136 into the alternating-current power and supply the alternating-current power to the motor generator 192 to be the load; the capacitor module 130 that smoothes the direct-current power from the battery 136; the control circuit 201 that outputs the control signals to control the operation of the IGBTs 210 and 220 at the time of driving the motor generator 192; the discharging microcomputer 304 or the discharging IC 420 that outputs the discharge control signals to control the operation of the IGBTs 210 and 220 at the time of discharging the capacitor module 130; the power supply circuit 306 that generates the power supply voltage to operate the discharging microcomputer 304 or the discharging IC 420 on the basis of the voltage between both ends of the capacitor module 130; and the power driver 302 that outputs the driving signal to operate the IGBTs 210 and 220 on the basis of the control signals or the discharge control signals. In addition, the IGBTs 210 and 220 are operated according to the discharge control signals and the current flows from the capacitor module 130 to the motor generator 192 through the IGBTs 210 and 220, thereby discharging the capacitor module 130. In this way, the power conversion apparatus 100 can perform the discharge control of the capacitor module 130, even when the power supply of the control circuit 201 is lost. In addition, the external discharge resistor and the switching element to be expensive that can withstand a large current flown at the time of the discharge are not necessary and the structure for making heat generated from the external discharge resistor at the time of the discharge dissipated is not necessary. Therefore, a cheap circuit configuration can be realized.

(2) The logic circuits 301 and 421 intercept the outputs of the control signals from the control circuit 201 to the power driver 302, according to the discharge switching signals output from the discharging microcomputer 304 or the discharging IC 420, when the discharge control signals are output. In this way, when the capacitor module 130 is discharged, the IGBTs 210 and 220 can be operated surely according to the discharge control signals from the discharging microcomputer 304 or the discharging IC 420 and these elements can be prevented from being operated erroneously according to the control signals from the control circuit 201.

(3) The discharging microcomputer 304 can output the PWM signal based on the fundamental wave changing cyclically at the cycle faster than the maximum rotational speed of the motor generator 192 as the discharge control signal. In this way, the current can be flown from the capacitor module 130 to the motor generator 192 while a state in which the motor generator 192 is not driven is maintained. For this reason, the capacitor module 130 can be discharged without affecting the behavior of the HEV 110.

(4) The discharging IC 420 outputs the signals of the predetermined patterns to make any one of the IGBTs 210 of the upper arms and any one of the IGBTs of the lower arms establish electrical continuity and then make all of the IGBTs 210 of the upper arms or all of the IGBTs of the lower arms establish electrical continuity, as the discharge control signals. In this way, the current can be flown from the capacitor module 130 to the motor generator 192 and the capacitor module 130 can be discharged, without using the high-speed PWM signals as the discharge control signals.

(5) The control circuit 201 outputs the discharge command signals to instruct to discharge the capacitor module 130 to the discharging microcomputer 304 or the discharging IC 420, by the microcomputer 303. The discharging microcomputer 304 and the discharging IC 420 output the discharge control signals according to the discharge command signals. In this way, when the capacitor module 130 is discharged, the discharge control signals can be output surely from the discharging microcomputer 304 or the discharging IC 420 according to the commands from the control circuit 201.

(6) The discharging microcomputer 304 and the discharging IC 420 determine the operation state of the control circuit 201 on the basis of the discharge command signals and when it is determined that the control circuit 201 is not normally operated, the discharging microcomputer 304 and the discharging IC 420 output the discharge control signals. In this way, when the control circuit 201 is not normally operated, the capacitor module 130 can be discharged surely.

(7) The discharging microcomputer 304 and the discharging IC 420 calculate the voltage between both ends of the capacitor module 130 and perform the overvoltage detection on the basis of the calculation result. Thereby, when the overvoltage is generated in the power conversion apparatus 100, the generation of the overvoltage can be detected and the power conversion apparatus 100 can be protected.

(8) Because the LED 232 reports whether the capacitor module 130 is discharged, it is possible to visually and simply determine whether the capacitor module 130 is discharged.

In the embodiments described above, the discharge control signals are supplied or intercepted from the control circuit 201 to the power driver 302 by the logic circuit 301 or the logic circuit 421, according to the discharge switching signals output by the discharging microcomputer 304 or the discharging IC 420. However, the switching operation may be realized using elements other than the logic circuits 301 and 421. For example, a switch operating according to the discharge switching signal is provided and the discharge control signal from the control circuit 201 can be supplied or intercepted by the switch. In addition, the switching operation of the discharge control signals at the timing of discharging the capacitor module 130 can be realized using various circuits operating according to the discharge switching signals.

In the embodiments described above, the example of the case in which the three OR circuits in the logic circuit 421 are provided to correspond to the individual IGBTs 210 of the upper arms in the individual phases and one OR circuit is provided to correspond to the IGBT 220 of the lower arm in any one phase has been described as the second example. In addition, the example of the case in which the IGBTs 210 of the upper arms in all of the phases are supplied with power and the current from the capacitor module 130 flows back in the motor generator 192, so that the capacitor module 130 is discharged has been described. However, the upper arms and the lower arms may be changed. Even in this case, the same functions and effects as the above case can be achieved.

The embodiments, the examples, and the various modifications described above are only exemplary and the present invention is not limited by the above content, as long as a characteristic of the invention is not damaged.

The various embodiments and modifications have been described. However, the present invention is not limited by the above content. Other aspects that are considered in a range of the technical idea of the present invention are also included in a range of the present invention.

The present invention contains subject matter related to that disclosed in Japanese Priority Patent Application JP 2011-252807 filed in the Japan Patent Office on Nov. 18, 2011, the entire content of which is hereby incorporated by reference.

The invention claimed is:

1. A power conversion apparatus, comprising:
   a power conversion element that converts direct-current power supplied from a direct-current power supply into alternating-current power and supplies the alternating-current power to a load;
   a capacitor that smoothes the direct-current power;
   a control circuit that outputs a control signal to control operation of the power conversion element at the time of driving the load;
   a discharge control unit that outputs a discharge control signal to control operation of the power conversion element at the time of discharging the capacitor, and outputs a discharge switching signal to pass or intercept the control signal according to an output state of the discharge control signal;
   a power supply circuit that generates a power supply voltage to operate the discharge control unit, on the basis of a voltage between both ends of the capacitor;
   a switching circuit that receives the control signal from the control circuit, receives the discharge control signal and the discharge switching signal from the discharge control unit, and outputs the control signal or the discharge control signal based on the discharge switching signal, and
   a driver unit that outputs a driving signal to operate the power conversion element, on the basis of the control signal or the discharge control signal output from the switching circuit,
   wherein the power conversion element is operated according to the discharge control signal, a current is flown from the capacitor to the load through the power conversion element, and the capacitor is discharged.

2. The power conversion apparatus according to claim 1, wherein the load is an alternating-current motor and the discharge control unit outputs a PWM signal based on a fundamental wave changing cyclically at a cycle faster than a maximum rotational speed of the alternating-current motor as the discharge control signal.

3. The power conversion apparatus according to claim 1, wherein the load is an alternating-current motor,
   the power conversion element includes a plurality of upper arm power conversion elements arranged at a high voltage side and a plurality of lower arm power conversion elements arranged at a low voltage side, and
   the discharge control unit outputs a signal of a predetermined pattern to make any one of the upper arm power conversion elements and any one of the lower arm power conversion elements establish electric continuity and then make all of the upper arm power conversion elements or all of the lower arm power conversion elements establish electric continuity, as the discharge control signal.

4. The power conversion apparatus according to claim 1, wherein the control circuit outputs a discharge command signal to instruct to discharge the capacitor to the discharge control unit and the discharge control unit outputs the discharge control signal according to the discharge command signal.

5. The power conversion apparatus according to claim 4, wherein the discharge control unit determines an operation state of the control circuit on the basis of the discharge command signal and when it is determined that the control circuit is not normally operated, the discharge control unit outputs the discharge control signal.

6. The power conversion apparatus according to claim 1, wherein the discharge control unit calculates a voltage between both ends of the capacitor and performs overvoltage detection on the basis of a calculation result thereof.

7. The power conversion apparatus according to claim 1, further comprising:
a reporting unit that reports whether the capacitor is discharged.

8. The power conversion apparatus according to claim 7, wherein the reporting unit is composed of a light emitting element.

9. The power conversion apparatus according to claim 1, wherein
the discharge control unit outputs a predetermined first signal to pass the control signal as the discharge switching signal to the switching circuit when the discharge control unit does not output the discharge control signal;
the discharge control unit outputs a predetermined second signal to intercept the control signal as the discharge switching signal to the switching circuit when the discharge control unit outputs the discharge control signal; and
the switching circuit intercepts the control signal from the control circuit based on the second signal, and passes the discharge control signal from the discharge control unit to output the discharge control signal to the driver unit.

10. The power conversion apparatus according to claim 9, wherein the load is an alternating-current motor and the discharge control unit outputs a PWM signal based on a fundamental wave changing cyclically at a cycle faster than a maximum rotational speed of the alternating-current motor as the discharge control signal.

11. The power conversion apparatus according to claim 9, wherein
the load is an alternating-current motor,
the power conversion element includes a plurality of upper arm power conversion elements arranged at a high voltage side and a plurality of lower arm power conversion elements arranged at a low voltage side, and
the discharge control unit outputs a signal of a predetermined pattern to make any one of the upper arm power conversion elements and any one of the lower arm power conversion elements establish electric continuity and then make all of the upper arm power conversion elements or all of the lower arm power conversion elements establish electric continuity, as the discharge control signal.

12. The power conversion apparatus according to claim 9, wherein the control circuit outputs a discharge command signal to instruct to discharge the capacitor to the discharge control unit and the discharge control unit outputs the discharge control signal according to the discharge command signal.

13. The power conversion apparatus according to claim 12, wherein the discharge control unit determines an operation state of the control circuit on the basis of the discharge command signal and when it is determined that the control circuit is not normally operated, the discharge control unit outputs the discharge control signal.

14. The power conversion apparatus according to claim 9, wherein the discharge control unit calculates a voltage between both ends of the capacitor and performs overvoltage detection on the basis of a calculation result thereof.

15. The power conversion apparatus according to claim 9, further comprising:
a reporting unit that reports whether the capacitor is discharged.

16. The power conversion apparatus according to claim 9, wherein the reporting unit is composed of a light emitting element.

* * * * *